UNITED STATES PATENT OFFICE.

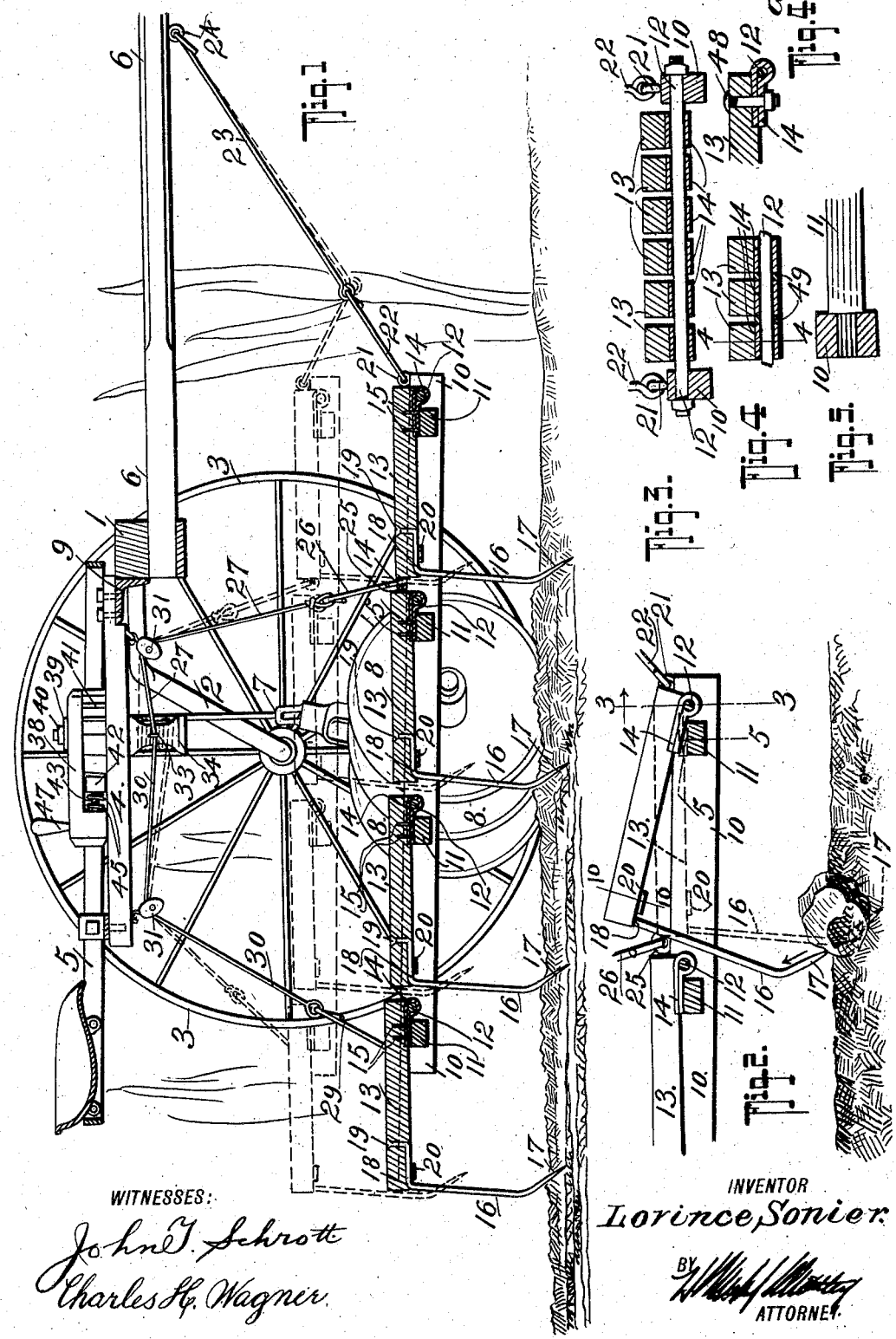

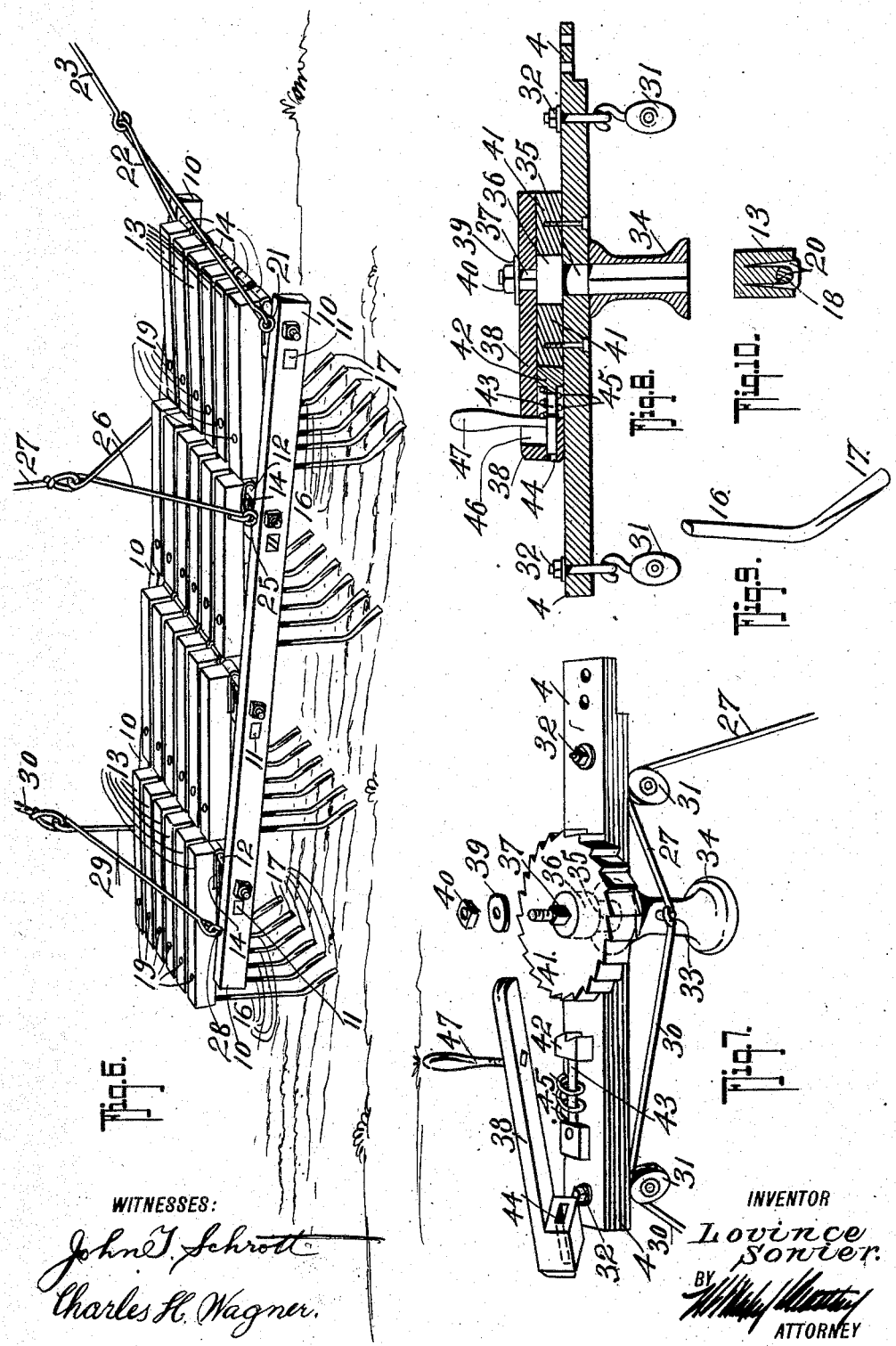

LOVINCE SONIER, OF GRAY, LOUISIANA.

ATTACHMENT FOR CULTIVATORS.

981,023.    Specification of Letters Patent.    Patented Jan. 10, 1911.

Application filed August 9, 1910. Serial No. 576,316.

*To all whom it may concern:*

Be it known that I, LOVINCE SONIER, residing at Gray P. O., in the parish of Terrebonne and State of Louisiana, have invented certain new and useful Improvements in Attachments for Cultivators, of which the following is a specification.

My invention is a new and useful attachment for wheeled cultivators and the like, the invention primarily having for its object to provide a harrow and weeder attachment that may be placed on any wheeled agricultural machine to weed between the rows of cultivation and crush any clods that may be present when the harrow is drawn over the field.

Generically the invention provides a frame that may be flexibly and adjustably supported between the disks of a double disk harrow and between the wheels thereof, the frame having several transverse shafts on which longitudinal bars are hinged, the bars carrying harrow teeth at their outer ends while the frame carries stops to hold the bars in a horizontal position. The tooth bar carrying frame is suspended beneath the wheeled vehicle frame by block and tackle and may be raised and lowered through the same means, the front end of the frame being flexibly joined to the tongue or draft bar of the vehicle.

In its more detailed nature, the invention also consists in those novel details of construction, combination and arrangement of parts, all of which will be first fully described in the accompanying drawings, in which:

Figure 1, is a central vertical longitudinal section of a double disk cultivator with the invention applied. Fig. 2, is a detail sectional elevation of a part of the invention showing how the hinged tooth carrying bars rest to allow the teeth to pass over obstructions. Fig. 3, is a cross section on the line 3—3 of Fig. 2. Fig. 4, is a similar view of a modification. Fig. 4ª, is a cross section on the line 4—4 of Fig. 4. Fig. 5, is a detail view showing how the transverse frame bars or rests are connected to the frame. Fig. 6, is a perspective view of a part of the invention. Fig. 7, is a detail perspective view of another part of the same, showing the ratchet and pawl mechanism, parts being detached for convenience of illustration. Fig. 8, is a central vertical longitudinal section of the parts shown in Fig. 7. Fig. 9, is a perspective view of a part of a tooth. Fig. 10, is a section on the line 10—10 of Fig. 2.

Referring now to the accompanying drawings, in which like letters and numerals of reference indicate like parts in all of the figures, the wheeled vehicle 1, to which my invention may be attached, may be of any approved type, for convenience of illustration, however, I have shown my invention applied to a disk cultivator. The wheeled carrying frame 2 of the cultivator carries the wheels 3 in the usual manner, and by a bracket 9 the seat support frame bar 4 is secured to the main transverse frame bar that carries the draft bar or tongue 6. The seat frame 5 is supported on the bar 4 in the usual manner.

The plow disk carrying frames 7 are provided with the usual disks 8. All parts numbered from 1 to 9 may be of the ordinary construction, as they *per se*, constitute no part of my present invention. The parts numbered 10 *et seq.* are those in which the principal part of my invention *per se*, lies. By referring to Figs. 1 and 6 of the drawings, it will be noticed that I provide a longitudinal transverse frame consisting of the side bars 10 that are connected together by the transverse bars 11 which have mortise and tenon connection with the bars 10.

Paralleling and close to the bars 11 are shafts 12 in the nature of bolts or the like on which the tooth carrying bars 13 are pivoted through the medium of the hinges 14 which are penetrated by the rods 12, the hinges 14 being secured to their tooth bars 13 at 15 in any suitable manner.

Each tooth bar 13 carries a tooth 16 which has its lower end bent forwardly and flattened into a chisel shape as at 17 while that end of the tooth 16 that joins with the bar 13 is bent over at 18 and held in a groove in the bar 13. The end of the bent over part 18 is upwardly bent and passed through an aperture in the bar 13 and may have its upper end upset as at 19, if desired, a staple or other suitable device 20 being provided to retain the portion 18 of the tooth in place. Thus the teeth 16 are rigidly secured to their respective tooth bars 13.

Each rod or shaft 12 carries a set of tooth bars 13, there being four sets of tooth bars embodied in the attachment and each set consisting of several tooth bars, six being shown in the drawings. The tooth bars 13 may be loosely pivoted on the shaft 12 that is they may have limited lateral movement on said shaft, no washers or spacing members being interposed between the same, (see Fig. 3) or if desired washers 49 may be placed between the tooth bars 13 so as to hold their hinge portions in a fixed position with relation to the shaft 12 as in Fig. 4 and when this is the case the tooth bars 13 may be pivoted by a single bolt or connection 48 to their respective hinges 14, so as to have movement in a horizontal or substatnially horizontal plane.

At the front end of the frame 10 are eyes 21 to which a bail 22 is attached, the bail 22 being connected by a rod 23 to the eye 24 on the tongue 6 of the vehicle so that the frame 10 may be drawn along through the medium of the connection 22. Two additional sets of eyes 25—28 are provided on the frame 10 to which bails 26—29 respectively are connected. Cables 27—30 respectively connect to the bails 26—29 and pass through pulley blocks 31 that are secured at 32 to the seat supporting bar 4 of the vehicle, the cables 27—30 passing to a drum 34 to which they are secured at 33 and on which they may be wound up or unwound to raise or lower the frame 10, as conditions may be required.

The drum 34 is carried on a short stub 35 which is mounted in a bearing in the bar 4 and has a collar 36 to hold it in place the shaft 35 having a square portion 37 to fit the lever 38 which may be held in place by a nut 40 and washer 39 on the projecting part of the shaft 35.

Bolted or otherwise secured to the bar 4 and held around the collar 36 of the shaft 35 is a ratchet disk 41 with which a pawl 42 is held to be engaged by a spring 45, the pawl 42 having a shank 43 slidable in a hole 44 in the lever 38 and carrying a handle 47 by means of which the member 42 may be moved out of engagement with the disk 41, and the lever 38 may be turned, the lever having a slot 46 to permit limited movement of the handle 47 to release latch 42.

In practice my invention may be used in connection with any wheeled cultivator machine that will straddle a cultivator row it being shown as applied to a disk cultivator, or the connection used by itself by simply mounting it in a wheeled frame omitting the cultivator disks and their frame 7 if it is desired to use the invention by itself.

Attention is called to the fact that by constructing the teeth with the forwardly projecting portions 17 it insures such teeth remaining in the ground while the apparatus is being drawn over the field unless some immovable obstruction (see Fig. 2) interferes with the movement of the teeth 16 when the hinged tooth bars 13 will move up to permit the teeth to rise up over the obstruction without damaging the machine or breaking the teeth and again by mounting the bars 13 to have a limited horizontal movement along the bar 12 and a pivoted movement on the pivot 48 if the modified form is used, the teeth 16 may pass around an obstruction if it is not too large and thus it will not be necessary for the bars 13 to rise.

From the foregoing description taken in connection with the accompanying drawings it is thought the complete construction, operation and advantages of my invention will be readily understood by those skilled in the art to which the invention appertains.

What I claim is:

1. The combination with a wheeled vehicle, of a frame flexibly and adjustably supported beneath said vehicle and between the wheels thereof, said frame comprising longitudinal bars and transverse bars, shafts paralleling said transverse bars, tooth carrying bars hinged to said shafts and resting on said transverse bars.

2. The combination with a wheeled vehicle, of a frame flexibly and adjustably supported beneath said vehicle and between the wheels thereof, said frame comprising longitudinal bars and transverse bars, shafts paralleling said transverse bars, tooth carrying bars hinged to said shafts and resting on said transverse bars, a connection between the front end of said frame and the draft bar or tongue of said wheeled vehicle, and block and tackle connected to said vehicle for raising and lowering said frame and means for holding said block and tackle to maintain the frame in its adjusted positions.

3. An attachment for agricultural machinery that comprises a frame consisting of longitudinal bars connected by transverse bars, shafts carried by said longitudinal bars and paralleling said transverse bars, a set of tooth carrying bars pivoted to said transverse bars and resting on said transverse bars, and means in virtue of which said frame may be supported in an operative position relatively to the ground and drawn over the ground.

LOVINCE SONIER.

Witnesses:
 G. J. KNOBLOCH,
 CHAS. N. DUYSÉ.